UNITED STATES PATENT OFFICE.

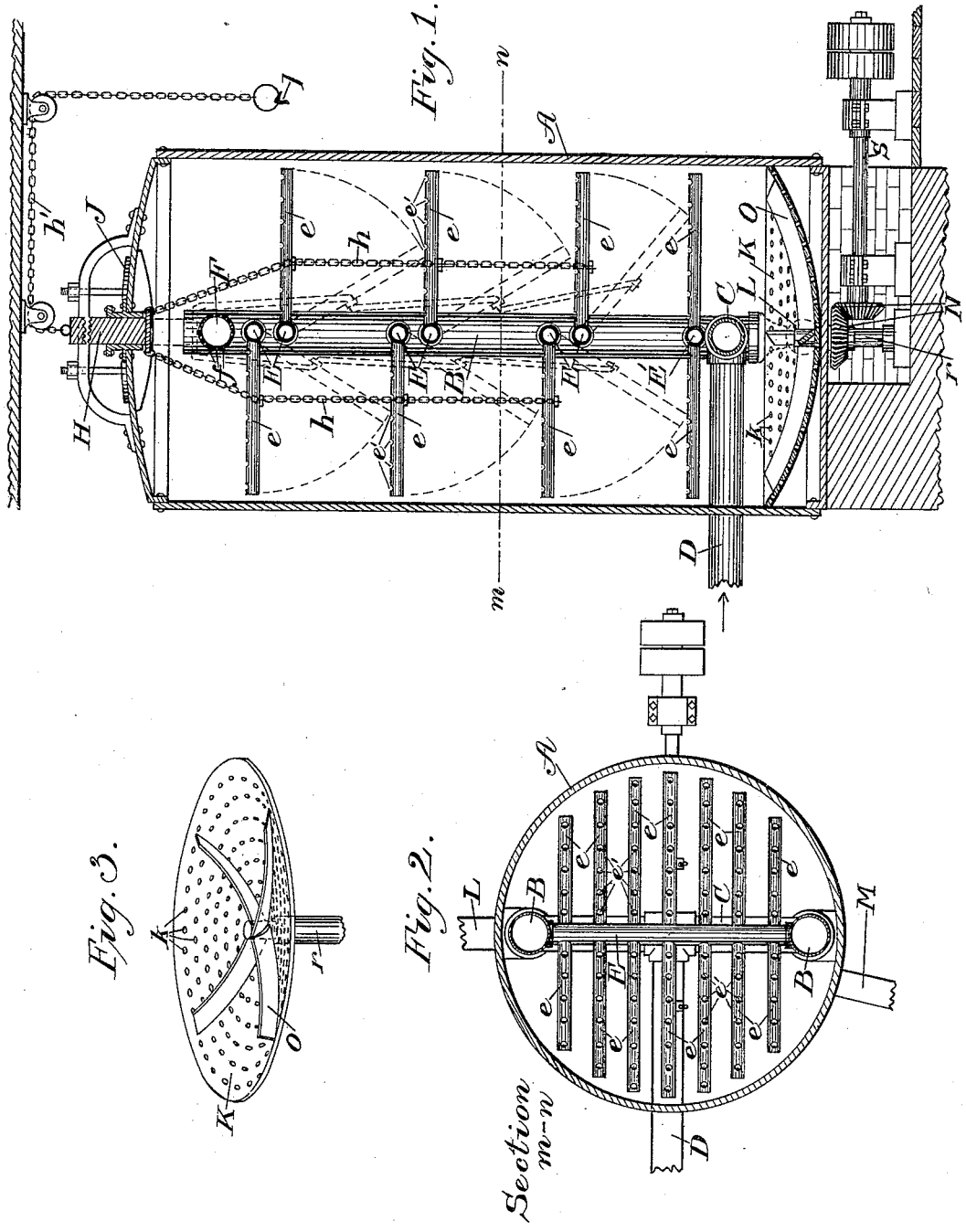

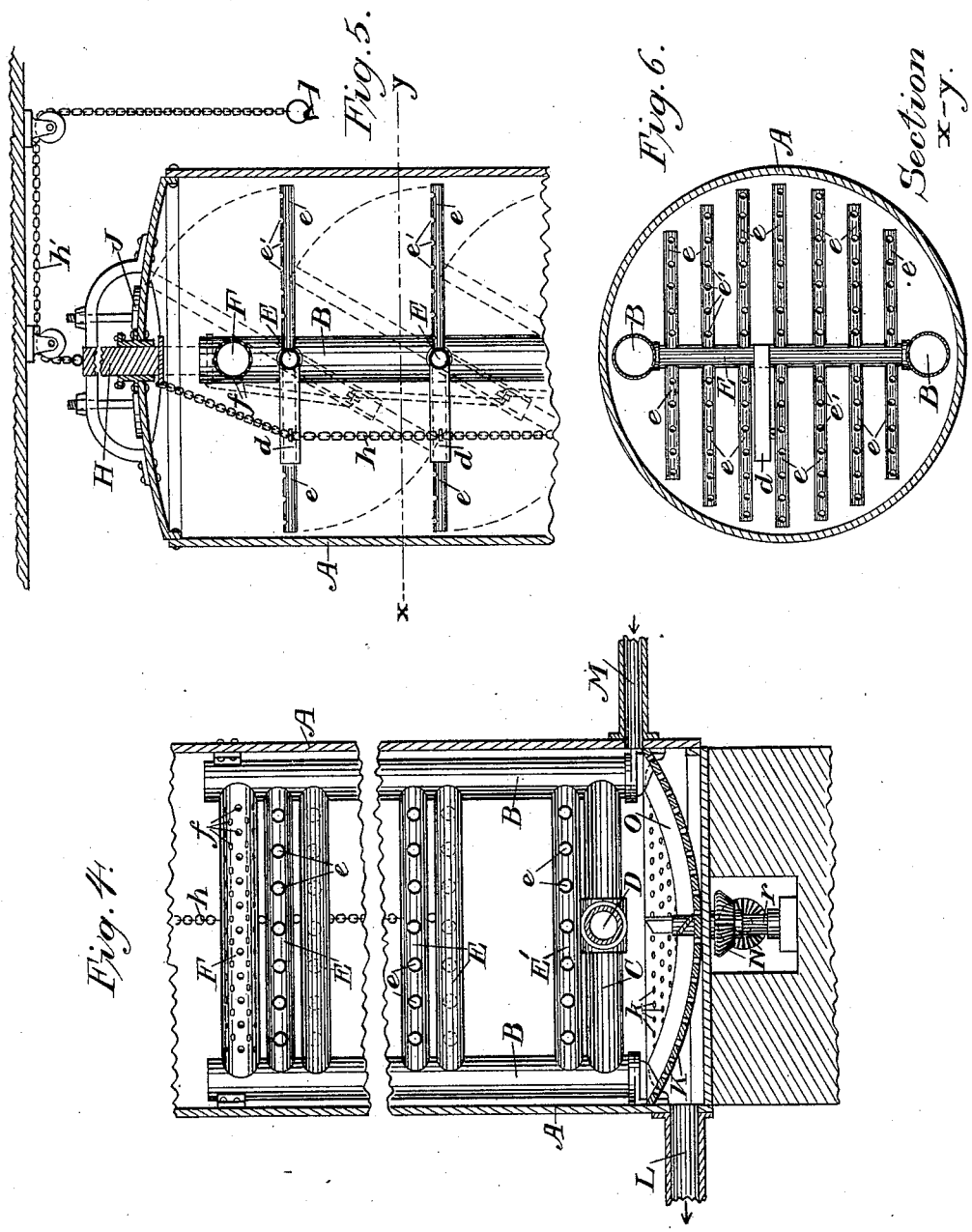

FREDRIC C. LOVEJOY, OF ALBANY, NEW YORK.

DIGESTER.

SPECIFICATION forming part of Letters Patent No. 429,692, dated June 10, 1890.

Application filed August 1, 1889. Serial No. 319,472. (No model.)

*To all whom it may concern:*

Be it known that I, FREDRIC C. LOVEJOY, a citizen of the United States, residing at Albany, in the county of Albany and State of New York, have invented certain new and useful Improvements in Digesters; and I do hereby declare the following to be a full, clear, and exact description of the invention, such as will enable others skilled in the art to which it appertains to make and use the same.

My invention relates to the means for delivering the alkali or liquid used in making paper-pulp into the material or stock to be digested and for securing an even and universal circulation of said liquid, so as to insure complete and uniform digestion of said material.

In the digesters heretofore used many kinds of stock or material—such as saw-dust, cotton-seed hulls, and the like—have a tendency to settle down at the bottom of the digester and to become packed into a dense mass, which resists a free circulation of the liquid, thereby preventing a free and uniform circulation of the liquid and causing said stock to become baked.

The objects of my invention are, first, to cause the alkali or liquid to circulate evenly through all portions of the entire stock; second, to prevent said stock from settling and becoming packed at the bottom of the digester; third, to allow the alkali or liquid to be readily withdrawn from the digester for the purpose of being reheated. These objects I accomplish, first, by delivering the liquid or alkali directly into the interior of the body of stock by means of perforated pipes projecting into the interior of the digester; second, I prevent the mass of stock from settling and keep it of uniform density by means of jets of liquid formed by being forced through openings in the upper surface of the pipes, thereby creating a continuous upward movement of the liquid.

In the drawings, Figure 1 represents a vertical cross-section of a digester embodying my invention. Fig. 2 represents a horizontal cross-section of the same, taken on line *m n* of Fig. 1. Fig. 3 represents a perspective view of a perforated diaphragm and scraper removed from the main cylinder. Fig. 4 represents a vertical cross-section of the parts shown in Fig. 1, said section being taken on a vertical plane at a right angle to the plane of the section shown in said Fig. 1, a portion of the digester being broken away. Fig. 5 represents a vertical cross-section of the upper portion of a digester embodying a modification of my invention. Fig. 6 represents a horizontal cross-section taken on line *x y* of Fig. 5.

A represents a main cylinder placed on end and supported by brick-work or by other suitable means. Upright supply-pipes B are arranged within said cylinder and supported by means of any suitable construction and connected together by means of cross supply-pipes E arranged horizontally, their ends being movably journaled in the upright supply-pipes B. Connected with the upright supply-pipes B at their lower ends is the cross supply-pipe E', said pipe being similar in general construction to the pipes E; but the ends are rigidly secured in the pipes B instead of being movably journaled therein. The upper ends of the pipes B are closed and their extreme lower ends are shown connected together by means of a main supply-pipe C, having an inlet-pipe D connected therewith, through which the liquid is supplied to the vertical pipes B. Each of the cross supply-pipes E is supplied with perforated delivery-pipes *e* attached thereto. These delivery-pipes may extend from one side of the pipes E, as shown in Fig. 1, or they may extend from opposite sides thereof, as shown in Fig. 5. The extreme upper ends of the supply-pipes B are connected by means of a horizontal perforated delivery-pipe F. The lower portion of the cylinder is provided with a perforated diaphragm K, preferably formed concavo-convex in shape, through the center of which a shaft *r* passes, having scraper-blades O secured to its upper end, the scraping-blades O being inclined to the surface of the diaphragm. The lower end of said shaft is provided with a beveled gear N, which engages with a correspondingly-beveled gear attached to the horizontal shaft S, provided with suitable pulleys, by means of which said shaft is revolved. A shaft H is passed through the upper head of the cylinder and preferably through the center thereof, moving vertically in a steam-tight bushing. A chain *h'* is attached to the upper end of said shaft and passed over pulleys, as shown in Fig. 1. A collar formed on the lower end of the shafts limits its upward movement. The lower end of said shaft is connected with the bars $d$, attached to the journaled pipes E, by means of a chain.

The upper head of the digester is provided with a man-hole and plate J of ordinary construction. I prefer to place said man-hole directly over the cross supply-pipes E, so that the stock may be readily placed into the body of the cylinder. An outlet-pipe L is connected with the lower end of the cylinder, through which the alkali or liquid is withdrawn from the cylinder after it has been used.

When the cylinder is to be charged, the lower end of the chain $h'$ is released, when the preponderance of weight on one side of the pipes E, produced by the bar $d$ when constructed as shown in Fig. 5, and by the weight of the horizontal delivery-pipes themselves when constructed as shown in Fig. 1, will cause the horizontal delivery-pipes to drop downward into nearly a perpendicular position, as indicated by the dotted lines in the drawings. When the perforated delivery-pipes are in such position, the man-hole plate is removed, and the stock to be digested may then be readily placed within the cylinder, the tilting of the supply-pipes removing all obstruction from the inside of the cylinder while being charged. After the cylinder has been filled the man-hole plate is placed in position and the alkali or liquid used is forced under pressure into the cylinder. The handle on the lower end of the chain $h'$ is then drawn downward, so as to raise the delivery-pipes into a substantially horizontal position. The steam-pressure inside of the cylinder, being exerted against the lower end of the bar H, causes said bar to act as a piston to some extent and to materially aid in raising the delivery-pipes to such horizontal position. The delivery-pipes are held in such horizontal position by securing the lower end of the chain $h'$ to a pin or catch of any suitable construction.

The liquid is forced through the supply-pipe D into the cross supply-pipe C, and from thence up into the vertical supply-pipes B. The vertical supply-pipes B lead the liquid into the cross-pipes E, and it is then delivered into the cylinder through the perforations $e'$ of the delivery-pipes $e$, and also through the perforations $f$ of the delivery-pipe F.

By means of the construction shown the liquid is delivered directly into the central part of the cylinder and into all portions thereof at the same time. When the liquid is forced out of the perforations in the upper surface of the horizontal supply-pipes in a vertical direction, jets of liquid are formed which serve to continually force upward and separate the particles of material in the digester, thereby insuring an even and uniform distribution of the liquid through the mass and preventing the same from packing, settling, and baking. After the liquid has settled down through the mass of stock, it filters through the perforations $k$ of the diaphragm K, and is withdrawn through the pipe L and returns to the heater to be reheated and pumped back again into the cylinder. The revolving scraping-bars O prevent the perforations of the diaphragm from becoming choked up with particles of the stock.

I do not desire to be limited to the specific construction of any of the several parts shown herein, as each of such parts may be modified without departing from my invention.

What I claim is—

1. In a digester for boiling ligneous material, the combination, with a main cylinder and suitable supply-pipes secured therein, of multiple series of perforated delivery-pipes, each series being arranged in a horizontal plane, one series above another, each series being connected to a horizontal supply-pipe having its ends movably journaled in the main supply-pipes, substantially as described.

2. In a digester for boiling ligneous material, the combination, with a main cylinder and suitable supply-pipes connected therewith, of a series of perforated delivery-pipes arranged in a horizontal plane and connected to a horizontal supply-pipe having its ends movably journaled in the main supply-pipes, substantially as described.

3. In a digester for boiling ligneous material, the combination, with a main cylinder and suitable supply-pipes secured therein, of a series of perforated delivery-pipes arranged in a horizontal plane, a perforated diaphragm located below the delivery-pipes, and a revolving scraper mounted upon a vertical shaft, substantially as described.

4. In a digester for boiling ligneous material, the combination, with a main cylinder and suitable supply-pipes secured therein, of a series of perforated delivery-pipes arranged in a horizontal plane and connected to a horizontal supply-pipe having its ends movably journaled in the main supply-pipes, and a perforated diaphragm located at the lower end of the cylinder, substantially as described.

In testimony whereof I have affixed my signature in presence of two witnesses.

FREDRIC C. LOVEJOY.

Witnesses:
JAMES W. EATON, Jr.,
ROBERT W. HARDIE.